United States Patent
O'Neill et al.

(10) Patent No.: US 8,427,599 B2
(45) Date of Patent: Apr. 23, 2013

(54) BACKLIGHTING SYSTEM INCLUDING A SPECULAR PARTIAL REFLECTOR AND A CIRCULAR-MODE REFLECTIVE POLARIZER

(75) Inventors: Mark B. O'Neill, Stillwater, MN (US); Philip E. Watson, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 273 days.

(21) Appl. No.: 12/810,568

(22) PCT Filed: Dec. 22, 2008

(86) PCT No.: PCT/US2008/087967
§ 371 (c)(1),
(2), (4) Date: Nov. 5, 2010

(87) PCT Pub. No.: WO2009/086276
PCT Pub. Date: Jul. 9, 2009

(65) Prior Publication Data
US 2011/0037922 A1    Feb. 17, 2011

Related U.S. Application Data

(60) Provisional application No. 61/017,255, filed on Dec. 28, 2007.

(51) Int. Cl.
*G02F 1/1335* (2006.01)

(52) U.S. Cl.
USPC ............... 349/62; 349/96; 349/114; 349/115

(58) Field of Classification Search ............... 349/96, 349/9, 65, 113, 114, 62, 115, 117; 362/97.2, 362/606, 615, 617, 97.1, 19; 29/592.1
See application file for complete search history.

(56) References Cited

U.S. PATENT DOCUMENTS

| | | | |
|---|---|---|---|
| 5,751,388 A | 5/1998 | Larson | |
| 5,771,328 A | 6/1998 | Wortman | |
| 5,793,456 A | 8/1998 | Broer | |
| 5,825,543 A | 10/1998 | Ouderkirk | |
| 5,882,774 A | 3/1999 | Jonza | |
| 6,016,177 A * | 1/2000 | Motomura et al. | ............. 349/98 |
| 6,025,897 A | 2/2000 | Weber | |
| 6,122,103 A | 9/2000 | Perkins | |

(Continued)

FOREIGN PATENT DOCUMENTS

| WO | WO 97/01780 | 1/1997 |
|---|---|---|
| WO | WO 2007/002259 | 1/2007 |

OTHER PUBLICATIONS

International Search Report for PCT/US2008/087967, 4 pgs., Dec. 2008.

(Continued)

*Primary Examiner* — Thoi Duong
(74) *Attorney, Agent, or Firm* — Jay R. Pralle

(57) ABSTRACT

In a display backlight (120, 220, 420) a specular partial reflector (250, 450) is placed between a circular-mode reflective polarizer (242, 442) and an illumination device (230, 430). The specular partial reflector (450) recycles otherwise unused polarized light (468L) reflected from the circular-mode reflective polarizer (442) which results in an optimized backlight brightness. The main application of the backlight (120) is in liquid crystal displays (100).

14 Claims, 3 Drawing Sheets

U.S. PATENT DOCUMENTS

| | | | |
|---|---|---|---|
| 6,160,595 A | 12/2000 | Kishimoto | |
| 6,268,961 B1 * | 7/2001 | Nevitt et al. | 359/485.03 |
| 6,354,709 B1 | 3/2002 | Campbell | |
| 6,447,135 B1 | 9/2002 | Wortman | |
| 6,497,946 B1 | 12/2002 | Kretman | |
| 6,573,963 B2 | 6/2003 | Ouderkirk | |
| 6,876,427 B2 * | 4/2005 | Bowley et al. | 349/185 |
| 6,913,708 B2 | 7/2005 | Solomonson | |
| 6,917,399 B2 | 7/2005 | Pokorny | |
| 6,975,455 B1 * | 12/2005 | Kotchick et al. | 359/485.03 |
| 7,009,666 B2 | 3/2006 | Khan | |
| 2001/0026335 A1 | 10/2001 | Moon | |
| 2002/0061178 A1 | 5/2002 | Winston | |
| 2006/0285037 A1 | 12/2006 | Tsai | |

OTHER PUBLICATIONS

Written Opinion of the ISA for International Application No. PCT/US2008/087967, 7 pgs.

* cited by examiner

BACKLIGHTING SYSTEM INCLUDING A SPECULAR PARTIAL REFLECTOR AND A CIRCULAR-MODE REFLECTIVE POLARIZER

CROSS REFERENCE TO RELATED APPLICATIONS

This application is a national stage filing under 35 U.S.C. 371 of PCT/US2008/087967, filed on Dec. 22, 2008, which claims priority to U.S. Provisional Application No. 61/017,255, filed on Dec. 28, 2007, the disclosure of which is incorporated by reference in its/their entirety herein.

BACKGROUND

The present disclosure relates to information displays. More specifically, it relates to backlit optical information displays that include reflective polarizers.

Optical information displays are commonly used in televisions, laptop and desktop computers, hand-held devices such as mobile telephones, and other applications. A widely-used type of display is the liquid crystal (LC) display. A typical LC display is built around an LC panel, in which a liquid crystal with an associated electrode matrix is interleaved between a pair of absorptive polarizers. In an LC panel, portions of the liquid crystal have their optical state altered by an electric field applied via the electrode matrix. Depending on its state, a given portion (corresponding to a pixel or subpixel of the display) of the liquid crystal will rotate the polarization of light transmitted through it by a greater or lesser magnitude. Light progressing through entry polarizer, liquid crystal, and exit polarizer is attenuated to varying degrees depending on the optical state of the portion of liquid crystal that the light encounters. An LC display exploits this behavior to provide an electronically-controllable display having different appearances in different areas.

Because LC panels do not create light themselves, an LC display requires a source of illumination—typically either reflected ambient light, or more commonly, light from a backlight. The backlight generally includes an illumination device, which may include light sources such as light emitting diodes or fluorescent lamps, and a number of light management films between the illumination device and the LC panel. In general, the light management films may enhance the operation of a display by promoting more efficient and effective use of light.

SUMMARY

In one aspect, the present disclosure provides a backlight that includes an illumination device that has at least one light source, a circular-mode reflective polarizer, and a specular partial reflector. The specular partial reflector is disposed between the illumination device and the circular-mode reflective polarizer. Furthermore, the specular partial reflector is in substantially direct polarization communication with the circular-mode reflective polarizer.

In another aspect, the present disclosure provides a display that includes an LC panel and a backlight that provides light to the LC panel. The backlight includes an illumination device that has at least one light source, a circular-mode reflective polarizer, and a specular partial reflector. The circular-mode reflective polarizer is disposed between the display module and the illumination device and the specular partial reflector is located between the illumination device and the circular-mode reflective polarizer. Furthermore, the specular partial reflector is in substantially direct polarization communication with the circular-mode reflective polarizer.

In yet another aspect, the present disclosure provides a backlight for providing polarized light that includes an illumination device that has at least one light source, a circular-mode reflective polarizer, and a specular partial reflector. The circular-mode reflective polarizer is configured to transmit a first portion of light having a first circular polarization and reflect a second portion of light having a second circular polarization orthogonal to the first circular polarization. The specular partial reflector is located between the illumination device and the circular-mode reflective polarizer. It is suitable for receiving the second portion of light from the circular-mode reflective polarizer and returning a third portion of light to the circular-mode reflective polarizer. The third portion of light is a fraction of the second portion of light and has the first circular polarization that is transmittable by the circular-mode reflective polarizer.

In still another aspect, the present disclosure provides a method of making a backlight. The method includes providing an illumination device and a circular-mode reflective polarizer, selecting an orthogonal reflection fraction value for a specular partial reflector to result in an optimized backlight brightness, and placing a specular partial reflector having the selected orthogonal reflection fraction value between the illumination device and the circular-mode reflective polarizer. Furthermore, the specular partial reflector is in substantially direct polarization communication with the circular-mode reflective polarizer.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The present disclosure is described with respect to the appended Figures, in which like reference numerals generally designate like elements, and wherein.

DETAILED DESCRIPTION

Figure 1:
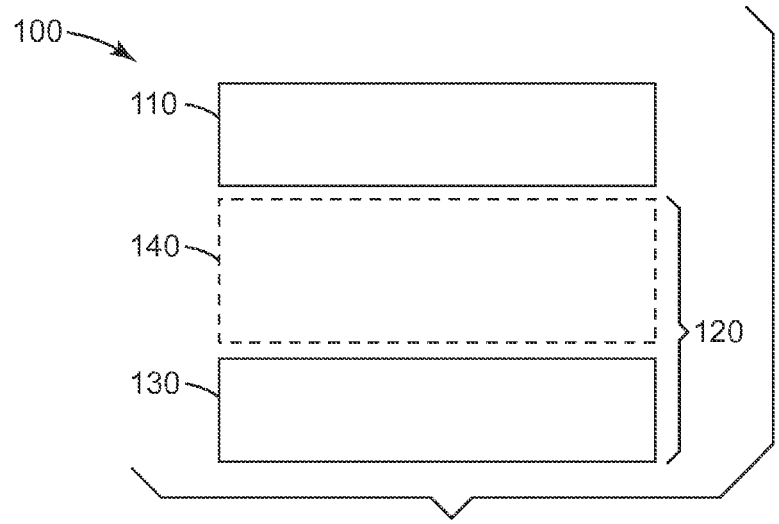
FIG. 1 is a schematic cross-sectional view of one embodiment of an optical display that can include light management components.

In general, the present disclosure provides a backlight that can efficiently recycle polarized light. Such polarized light may be used to illuminate an optical information display.

A backlight of an LC display provides light to the LC panel of the display, which forms an image from only light having the "pass" polarization that is transmitted through the entry polarizer of the panel. Light incident on the LC panel having the "block" polarization is generally absorbed by the entry polarizer and wasted. It is therefore of interest to maximize the amount of pass-polarized light reaching the panel from the backlight, and to minimize the amount of block-polarized light reaching the panel.

One technique for maximizing pass-polarized light and minimizing block-polarized light is to position a reflective polarizer between a backlight and an LC panel to transmit pass-polarized light to the LC panel and reflect block-polarized light back into the backlight. The reflected block polarization light can then be transformed into light of the pass polarization and transmitted through the reflective polarizer on a second or subsequent encounter.

The transformation of light from block to pass polarization can take place in a variety of ways. It may happen as a result of scattering of light in the backlight, which tends to randomize polarization. With randomization, at best half of the block polarized light may be turned into the pass polarization by scattering in a given cycle. Light of the block polarization encountering the reflective polarizer for a second or subsequent time may reflect into the backlight yet again for another chance to be randomized and eventually emitted, but will also be diminished in magnitude each time it recycles due to loss mechanisms. Backlights relying on randomization to enable recycling are commonly used in currently available displays. A potential improvement in backlight performance may be achieved through the use of other mechanisms for transforming the polarization of light that rely on deterministic processes.

In the present disclosure, polarization-transforming reflectors can be placed in a backlight to transform light deterministically from the block to the pass polarization for transmission through a reflective polarizer and then on to an LC panel. One placement for such a reflector is at the back of a backlight. A potential disadvantage of this placement is that light of the pass polarization, as it makes its way from the reflector in back to the reflective polarizer in front, may scatter from or refract through other backlight elements that may degrade the polarization. Another option is to place a polarization-transforming partial reflector more forward in the backlight, near the reflective polarizer, so that polarization-transformed light may proceed from the reflector to the reflective polarizer without encountering potentially deleterious intervening backlight components. A consideration in designs of this type is that the partial reflector will rearwardly reflect some light in the backlight before it ever reaches the reflective polarizer. However, in the present disclosure it is seen that the advantages of this reflector placement may overcome the disadvantages when the overall performance of the backlight system is considered.

FIG. 1 is a schematic cross-sectional view of one embodiment of an optical display 100. The display 100 includes an LC panel 110 and a backlight 120 that can provide light to the LC panel 110.

In some embodiments, the backlight 120 includes an illumination device 130 and one or more light management films 140 positioned between the illumination device and the LC panel 110. As is described further herein, the illumination device 130 can include one or more light sources (not shown) that can provide illumination light to the LC panel 110. The light management films 140 can include one or more of a variety of optical films or other components that enhance the operation of the display 100. It can include, for example, diffusers or prismatic brightness enhancement films that affect the angular distribution of light. The one or more light management films 140 can also include a reflective polarizer film that allows polarized light to reach the LC panel 110.

In some embodiments, the LC panel 110 modulates light of one ("pass") polarization and absorbs light of an orthogonal ("block") polarization. Depending on the state of portions (corresponding to pixels or subpixels of the display 100) of the liquid crystal of the LC panel 110, the polarization of incident light having the pass polarization is rotated by some magnitude, and the light is then transmitted in part, and absorbed in part, depending on the degree of rotation of polarization. In other embodiments, polarizing display modules based on technologies other than liquid crystals may be contemplated.

Of the light incident on the LC panel 110, substantially only the fraction of light having the pass polarization can be modulated by the LC panel, and the fraction of light having the block polarization is predominantly absorbed and not used. In view of this, it may be desirable to configure the backlight 120 to efficiently deliver as much light as possible to the LC panel 110 in the pass polarization, at the expense of the unused block polarization, in as far as other requirements for illumination of the LC panel are met. For this reason, the one or more light management films 140 can include a reflective polarizer to provide light having the pass polarization to the LC panel 110.

Reflective polarizers are designed to transmit light of a first polarization (which can be the aforementioned pass polarization, or a polarization state that can be converted into the pass polarization by, for example, a retarder) and reflect light of a second, orthogonal, polarization. When light from the illumination device 130 is incident upon a reflective polarizer, part of the light having the first polarization is transmitted toward the LC panel 110, and part of the light having the second polarization is reflected. Subsequently, part of the reflected light having the second polarization may then be re-reflected forward toward the reflective polarizer by any structure within the backlight (e.g., a reflector, not shown). In the process of being re-reflected forward, the polarization of the re-reflected light may be altered such that some of the light is now in the transmittable first polarization. Light remaining in the second (reflected) polarization may undergo further reflections until eventually it is transmitted though the reflective polarizer in the first polarization, or is absorbed in the optical cavity. Through this process, a reflective polarizer enables "recycling" of otherwise unused light having the second polarization. Description of a display incorporating a reflective polarizer can be found, e.g., in U.S. Pat. No. 6,025,897 (Weber et al.).

A recycling backlight as described herein can rely on one or more mechanisms for transforming some of the light having the second polarization that is reflected by the reflective polarizer into light having the transmittable first polarization. Typically, this occurs with the re-reflection of light off the back reflector of the illumination device 130. In this re-reflection, which sometimes is a diffuse reflection, the polarization may be scrambled, randomized, or otherwise mixed. Changes in polarization state may also occur as light transmits through or reflects from other backlight components as well. Generally only a portion of light reflected back toward the reflective polarizer is found in the transmittable first polarization.

If the reflected light having the second polarization can be efficiently transformed into light having the transmittable first polarization and returned to the reflective polarizer, then the backlight may be able to more efficiently deliver light in the first polarization to the LC panel 110. Exploitation of the properties of circular polarization can provide an avenue for doing so. A specular reflection reverses the handedness of circularly polarized light and provides a simple deterministic process for transforming between orthogonal polarization states. Such specular reflections could be provided by the back reflector at the rear of a backlight system, though optical components located between the back reflector and the reflective polarizer may interfere with the simple transformation from second to first polarization. With the appropriate placement of backlight components, this complication may be avoided. Backlights including one or more specular reflectors and circular-mode reflective polarizers are described herein.

Figure 2:
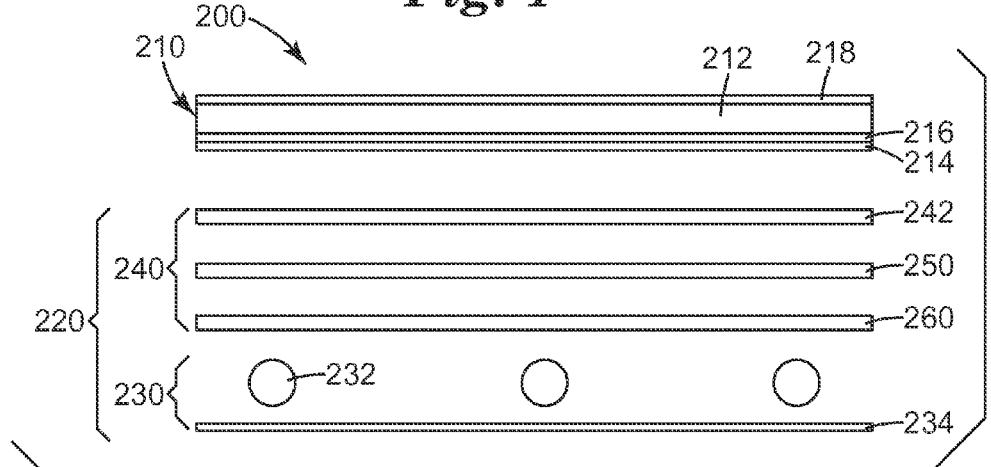
FIG. 2 is a schematic cross-sectional view of another embodiment of an optical display.

FIG. 2 is a schematic cross-sectional view of one embodiment of an optical display 200. The display 200 includes an LC panel 210 and a backlight 220. The backlight 220 includes an illumination device 230 and one or more light management films 240 positioned between the LC panel 210 and the illumination device 230.

The illumination device 230 includes one or more light sources 232. The light sources 232 can be linear, cold-cathode fluorescent lamps (CCFLs). Other types of light sources 232 may be used, however, such as other varieties of fluorescent lamps, incandescent lamps, light emitting diodes, organic light-emitting diodes or any other light sources that are found to be suitable.

The illumination device 230 can include a back reflector 234. The back reflector 234 may be a specular reflector, a diffuse reflector, or a combination specular and diffuse reflector. One example of a specular reflector is Vikuiti™ Enhanced Specular Reflector (ESR) film, available from 3M Company. Examples of suitable diffuse reflectors include polymers loaded with diffusely reflective particles. Other examples of diffuse reflectors including microporous materials and fibril-containing materials, as discussed, e.g., in U.S. Pat. No. 6,497,946 (Kretman et al.). Other types of reflectors than those listed here may be used for the back reflector 234 as well.

Figure 3:
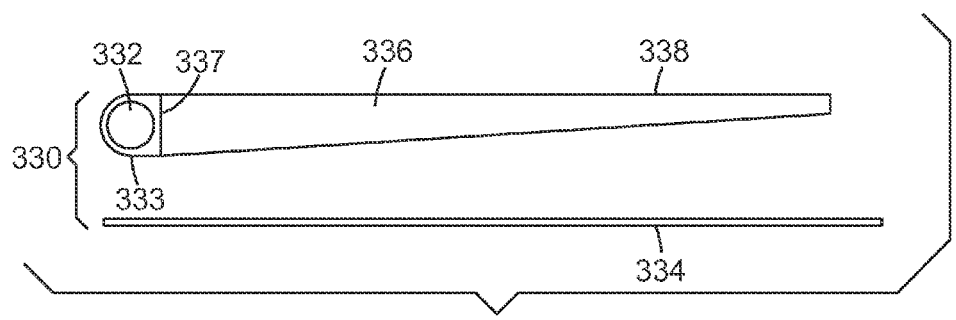
FIG. 3 is a schematic cross-sectional view of one embodiment of an illumination device.

The display 200 may be described as "direct-lit," having the light sources 232 positioned directly behind the LC panel 210. In other embodiments, the display 200 can include an edge-lit illumination device, e.g., edge-lit illumination device 330 of FIG. 3. Illumination device 330 includes one or more light sources 332 disposed at or near one or more edges 337 of lightguide 336. Lightguide 336 has a generally-planar slab or wedge shape, but may take any suitable form. A light source 332 is generally surrounded by a light source reflector 333 that promotes optical coupling of light emanating from the light source into the lightguide 336 via edge 337. Light propagates within the lightguide 336, in part assisted by total internal reflection, and proceeds out of the illumination device 330 via exit surface 338 toward the LC panel. The illumination device 330 may also include a back reflector 334, which may serve to redirect light rays in the direction of the LC panel. The back reflector 334 may be directly attached to the lightguide 336, as described, e.g., in U.S. Pat. No. 6,447,135 (Wortman et al.), or it may be structurally free-standing.

Returning to FIG. 2, the one or more light management films 240 can include optical films and possibly other structures intended to enhance and improve the performance of the backlight. In some embodiments, the one or more light management films 240 can include a circular-mode reflective polarizer 242. A circular-mode reflective polarizer substantially reflects light having one handedness of circular polarization incident thereupon, and substantially transmits light having the other, orthogonal handedness of circular polarization. It should be noted that the light reflected from the circular-mode reflective polarizer 242 maintains substantially the same handedness of circular polarization that characterized it prior to incidence on the polarizer. The light transmitted through the circular-mode reflective polarizer 242 may or may not have the polarization it possessed prior to incidence on the polarizer, depending on details of the polarizer's construction, as discussed further herein. The circular-mode reflective polarizer 242 may be a free-standing film, or it may be attached to another structure in the display 200. In some embodiments, the circular-mode reflective polarizer 242 is attached to the LC panel 210.

The circular-mode reflective polarizer 242 can include any suitable reflective polarizer, e.g., those polarizers described in U.S. Pat. No. 5,793,456 (Broer et al.). In general, circular-mode reflective polarizers may be formed in multiple ways. A circular-mode reflective polarizer can be formed using cholesteric liquid crystal materials. Cholesteric liquid crystal compounds are typically chiral molecules and can be polymers. Cholesteric liquid crystal compounds include compounds having a cholesteric liquid crystal phase in which the director (i.e., the unit vector in the direction of average local molecular alignment) of the liquid crystal rotates in a helical fashion along the dimension perpendicular to the director. The pitch of the cholesteric liquid crystal compound is the distance (in a direction perpendicular to the director) that it takes for the director to rotate through 360 degrees. This distance is typically 100 nm or more.

The pitch of a cholesteric liquid crystal compound can typically be altered by mixing or otherwise combining (e.g., by copolymerization) a cholesteric liquid crystal compound with a nematic liquid crystal compound. The pitch depends on the relative ratios by weight of the cholesteric liquid crystal compound and the nematic liquid crystal compound. The pitch is generally selected to be on the order of the wavelength of light of interest. The helical twist of the director results in a spatially periodic variation in the dielectric tensor, which in turn gives rise to the wavelength selective reflection of light. For example, the pitch can be selected such that the selective reflection is peaked in the visible, ultraviolet, or infrared wavelengths of light.

Cholesteric liquid crystal compositions (with or without additional nematic liquid crystal compound(s) or monomer(s) added to modify the pitch) can be formed into a layer that substantially reflects light having one circular polarization (e.g., left or right circularly polarized light) and substantially transmits light having the other circular polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material. Cholesteric liquid crystal materials are generally characterized with respect to normally incident light; however, it will be recognized that the response of these materials can be determined for non-normally incident light using known techniques.

A cholesteric liquid crystal layer of constant pitch will exhibit reflectivity over a limited bandwidth, typically 100 nm or less. To enhance the usefulness of reflective polarizers formed from cholesteric liquid crystal materials, multiple layers of different pitches can be employed, or a single layer with a discretely or continuously varying pitch can be used. Such constructions can result in reflective polarizers with broad bandwidths, covering, for example, the visible spectrum from approximately 400 to 700 nm. Discussions of cholesteric liquid crystal manufacturing processing and optical bodies can be found in U.S. Pat. Nos. 6,573,963 (Ouderkirk et al.); 6,876,427 (Watson et al.); 6,913,708 (Solomonson et al.); and 6,917,399 (Watson et al.). Nipocs™ (available from Nitto Denko of Japan) is one example of a suitable cholesteric liquid crystal film.

Figure 5:
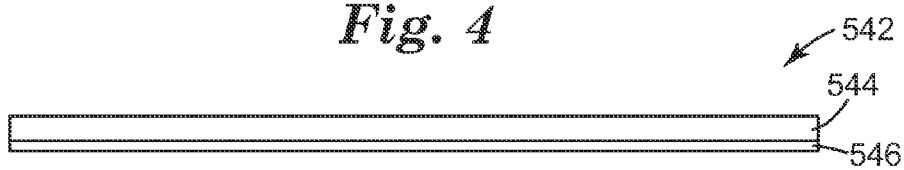
FIG. 5 is a schematic cross-sectional view of one embodiment of a circular-mode reflective polarizer.

A circular-mode reflective polarizer may also be made from a combination of other optical components. FIG. 5 is a cross-sectional view of a circular-mode reflective polarizer 542 formed from the combination of a linear-mode reflective polarizer 544 and a quarter-wave retarder 546. The two generally-planar components 544 and 546 may be physically connected, as illustrated, or they may be separated. Examples of linear-mode reflective polarizers include Vikuiti™ DBEF multilayer optical film reflective polarizers, as described, e.g., in U.S. Pat. No. 5,882,774 (Jonza et al.), and DRPF diffusely reflecting polarizing films, as described, e.g., in U.S. Pat. No. 5,825,543 (Ouderkirk et al.), both available from 3M Company. Wire grid polarizers as described, e.g., in U.S. Pat. No. 6,122,103 (Perkins et al.) are another type of linear-mode reflective polarizer. Quarter-wave retarders can be provided, for example, from oriented polymeric materials such as polycarbonate, polyethyl terephthalate, or polyvinyl alcohol, or from coated liquid crystal materials.

In such a circular-mode reflective polarizer 542, the linear-mode reflective polarizer 544 transmits light having a first linear polarization and reflects light having a second, orthogonal linear polarization. In general, when linearly-polarized light reflected by the linear-mode reflective polarizer 544 subsequently passes through the quarter-wave retarder 546, elliptically-polarized light will result. If the fast-axis of the quarter-wave retarder 546 is oriented at a 45 degree angle with respect to the polarization axis of the light reflected from the linear-mode reflective polarizer 544, circularly-polarized light results. Alternatively, as will be appreciated by one of skill in the art, other retarders with other orientations can be used to perform conversion of linear to circular, near-circular, or elliptical polarization.

Returning to FIG. 2, the one or more light management films 240 can further include a specular partial reflector 250. The specular partial reflector 250 is located between the illumination device 230 and the circular-mode reflective polarizer 242. In various embodiments, specular partial reflector 250 may take a variety of forms, including a free-standing component as represented in FIG. 2, or as a coating or other component attached to another structure of the backlight. Light incident upon the specular partial reflector 250 from the side facing the circular-mode reflective polarizer 242 is partially reflected in a substantially specular manner. This specular reflection of light by specular partial reflector 250 generally results in a reversal of handedness of circularly-polarized light, putting the reflected light in a state that the circular-mode reflective polarizer 242 may subsequently transmit, as described in more detail herein. The portion of light not reflected by the specular partial reflector 250 may or may not be transmitted specularly. For light incident on the specular partial reflector 250 from the side facing the illumination device 230, reflection and transmission (each considered independently) may or may not be specular.

Specular partial reflector 250 can include any suitable film or films or other optical components. Specular partial reflections may be provided by a component having another function in a backlight. For example, a specular partial reflector 250 may be provided by a low density surface textured film that is used as a coversheet, a film placed at the top or otherwise outer boundary of a collection of optical films. A specular partial reflector 250 could also be provided by the exit surface 338 of lightguide 336, or by another surface of one of light management films 240. Specular partial reflector 250 may also be provided by a dedicated film or films.

Specular partial reflectors may be formed in multiple ways. A specular partial reflector may be formed from a generally monolithic sheet of transparent dielectric material. The fresnel equations, combined with knowledge of the index of refraction of the dielectric, may be used to predict the reflectivity of major surfaces of such a specular partial reflector. Suitable materials include polymers such as polyethyl terephthalate, polycarbonate, or polymethyl methacrylate. Other ways to form a specular partial reflector are with a thin metalized or metallic layer, or with a patterned metalized or metallic layer, with regions of differing reflectivity and transmissivity. Such a layer may be coated upon or embedded within a dielectric substrate or slab.

Figure 6:
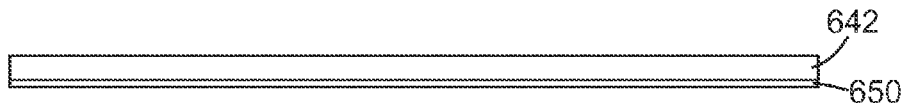
FIG. 6 is a schematic cross-sectional view of one embodiment of a circular-mode reflective polarizer including a coating.
Figure 7:
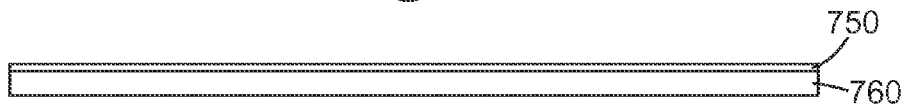
FIG. 7 is a schematic cross-sectional view of one embodiment of an optical film including a coating.

A dielectric or metallic partially reflective layer may be coated onto, attached to, or otherwise connected with another optical structure or substrate in a backlight to provide a specular partial reflector. The structure or substrate may provide an optical function different from that of the reflector. In the cross-sectional view of FIG. 6, for example, a partially reflective layer 650 is attached to circular-mode reflective polarizer 642. In the cross-sectional view of FIG. 7, a partially reflective layer 750 is connected with optical film 760. In the case of a dielectric layer, dielectrics with relatively high indices of refraction may be desirable, as they will generally provide a greater difference in index of refraction relative to neighboring media, and hence, stronger reflections.

Figure 8:
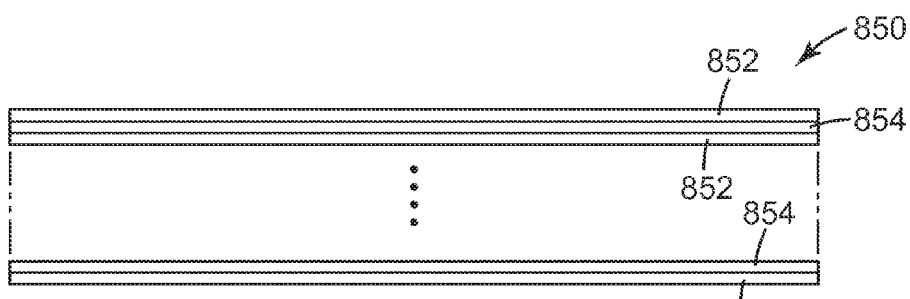
FIG. 8 is a schematic cross-sectional view of one embodiment of a multi-layer specular partial reflector.

A specular partial reflector may exploit reflection from multiple major surfaces. In a specular partial reflector formed from a monolithic sheet of transparent dielectric material, both surfaces of the sheet may serve to reflect light specularly. In another example, a multilayer optical film stack of transparent dielectric materials can serve as the basis for an engineered reflector. FIG. 8 is a schematic cross-sectional view of a multilayer specular partial reflector 850 including alternating layers 852 and 854 of dielectric material. Several parameters may affect the reflectivity of a multilayer stack, among which are layer thicknesses and the relationship between indices of refraction of the layers in the stack. The stack may be designed with alternating low and high index optically thin layers, meaning layers having thicknesses of the order of the wavelengths of interest, to exploit optical interference effects using standard thin film optics design criteria. Alternatively, thick layers having thicknesses the order of multiple wavelengths may be used, either of alternating low and high indices or of the same material, without interference effects bearing on performance.

Another design consideration for specular partial reflectors is the birefringence of dielectric materials used in the reflectors. Birefringence may affect reflector performance in at least two ways. First, in any reflector in which light propagates internally within a birefringent dielectric, the birefringence may affect or alter the polarization of the light. In general, circularly polarized light may be transformed into an elliptical polarization state. Second, reflections of light waves off of an interface with a birefringent material will in general be sensitive to the birefringence of the material, as polarization components of the waves will be reflected by differing magnitudes depending on the refractive indices along polarization axes, as described by the Fresnel equations. In the present disclosure, some specular partial reflectors will include one or more substantially non-birefringent materials.

As described herein, a specular partial reflector of the present disclosure will have the property that light incident upon it from the side facing the circular-mode reflective polarizer is partially reflected in a substantially specular manner. In general, the specular reflection of normally-incident, circularly-polarized light at normal incidence off of an isotropic substrate will result in a reflected light with a reversed (orthogonal) handedness of polarization. To the extent that the reflection deviates from specular, the polarization of the reflected light may relate less deterministically on the polarization of the incident light. Replacing the specular partial reflector with an optical sheet having a topologically rough surface, for example, could result in highly diffusely reflected light of mixed polarization. Also, as discussed herein, a birefringent substrate may result in specular reflections that do not entirely reverse the handedness of circularly polarized light. To account for these and other effects, a reflector may be characterized by the fraction of incident circularly-polarized light that is reflected in the polarization state orthogonal to that of the incident light, which may be referred to as the orthogonal reflection fraction. For example, a reflector formed from an isotropic material having an index of refraction of 1.5 nominally reflects 4% of normally incident light, assuming incidence from air. If the reflective surface in this example is very smooth, the orthogonal reflection fraction value for the reflector may approach 4%. If we consider two smooth sides of a sheet of such a material, the value may approach 8%. An alternative reflector formed from the same material, but with a very rough surface that reflects highly diffusely, may randomize polarization considerably, and the orthogonal reflection fraction may be much lower, for example, around 2%.

Once again returning to FIG. 2, other components, such as exemplary optical film 260, can also be included in the one or more light management films 240. Optical film 260 can be a film affecting the angular distribution of light, such as Vikuiti™ BEF-III brightness enhancement film, available from 3M Company. Descriptions of brightness enhancement films can be found, e.g., in U.S. Pat. Nos. 5,771,328 (Wortman et al.) and 6,354,709 (Campbell et al.). Such brightness enhancing films typically include a surface structure that redirects off-axis light in a direction closer to the axis of the display. Other possible components include, but are not limited to, diffusers, diffuser plates, gain diffusers, turning films, polarizers, reflective polarizers, retarders, or transflectors. In FIG. 2, optical film 260 is depicted as being located between the specular partial reflector 250 and the illumination device 230.

In some embodiments, there is direct optical communication between the polarizer 242 and the reflector 250, such that light traveling therebetween is not substantially acted upon in regards to its various physical characteristics such as radiance, direction of propagation, spectral composition, and polarization state. In other embodiments, one or more of the physical characteristics of light traveling between polarizer 242 and reflector 250 can be affected by intervening backlight components, while one or more others remain substantially unaffected. When a physical characteristic of light propagating between parts is unaffected, the parts may be described as being, for example in "direct polarization communication" or "direct spectral communication." In some embodiments of the present disclosure, the circular-mode reflective polarizer 242 and the specular partial reflector 250 are in substantially direct polarization communication.

The configuration of the LC panel 210 in general will depend in part on the configuration of the backlight 220 of the display 200. In one embodiment, as illustrated in FIG. 2, the LC panel 210 includes a liquid crystal layer 212 with associated electrode matrix, a retarder 214, a first absorbing polarizer 216, and a second absorbing polarizer 218. In this embodiment, light propagating from the circular-mode reflective polarizer 242 and incident upon the LC panel 210 is circularly polarized. The retarder 214 affects the phases of the constituent polarization components of the light, transforming it from circular to linear polarization. This linearly polarized light is then incident upon first absorbing polarizer 216, whose pass-axis is aligned with the axis of polarization of the light from the retarder 214. The first absorbing polarizer 216 serves to increase the contrast of the polarization of the light entering the liquid crystal layer 212. The first absorbing polarizer 216 may sometimes be referred to as a "clean-up" polarizer.

In another embodiment, the LC panel 210 does not necessarily include the retarder 214. This configuration would be appropriate for a backlight in which the circular-mode reflective polarizer 242 passes linearly polarized light to the LC panel 210. In still other embodiments, the LC panel 210 may lack a first absorbing polarizer 216, but include a second absorbing polarizer 218, optionally with a retarder between the liquid crystal layer 212 and the second absorbing polarizer. Other embodiments of LC panels may include other configurations of polarizers and retarders.

Backlight configurations as discussed herein can efficiently illuminate a liquid crystal panel with polarized light. In general, these configurations efficiently recycle light reflected from a reflective polarizer, transforming such reflected light into a polarization state that can be transmitted by the reflective polarizer on subsequent encounters as the light propagates out of the backlight toward a LC panel. The following discussion illustrates these ideas by describing aspects of the operation of a backlight 420, shown in schematic cross-section in FIG. 4.

Figure 4:
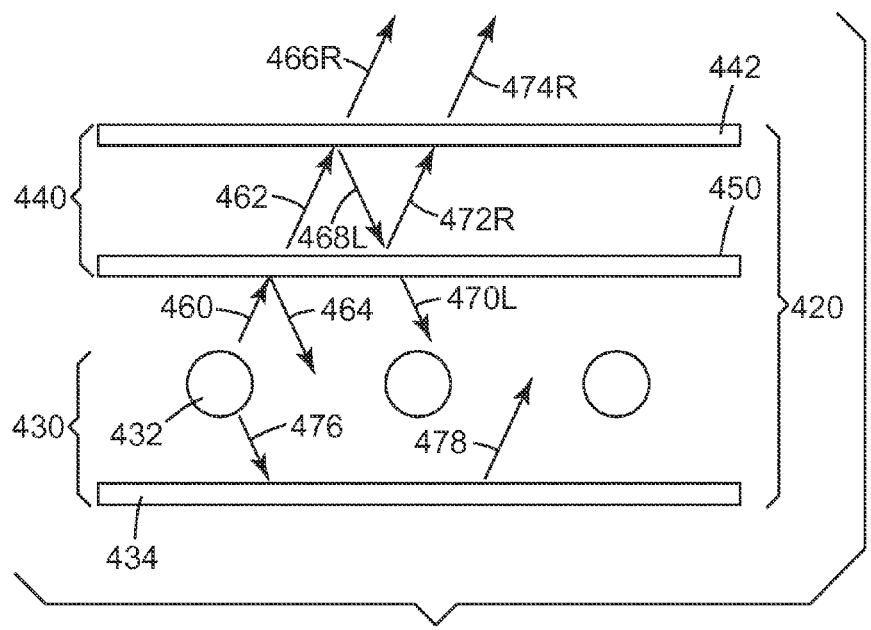
FIG. 4 is a schematic cross-sectional view of a portion of an illumination device and light management components of one embodiment of a backlight system.

The backlight 420 includes an illumination device 430, which includes one or more light sources 432 and a back reflector 434. One or more light management films 440 include a circular-mode reflective polarizer 442 and a specular partial reflector 450 positioned between the circular-mode reflective polarizer 442 and the illumination device 430. FIG. 4 also includes arrows indicating the direction of propagation of light within the backlight 420. In general, the directionality of the arrows in this figure is only significant with regard to propagation of light toward (up) or away from (down) the output direction of the backlight, which is toward the top of the figure (up), where an LC panel, for example, would be located. Directionality of the arrows to the right of the figure is only used for clarity and should not be considered to be limiting; actual rays will propagate toward the left also, and at a variety of angles as well.

The discussion of the operation of backlight 420 proceeds with examination of an exemplary portion of light 460 propagating from light source 432. In interacting with specular partial reflector 450, a portion of light 460 is transmitted through the partial reflector as light 462, and a portion is reflected as light 464. Light 462 next interacts with circular-mode reflective polarizer 442. At polarizer 442, a portion of the incident light 462 is transmitted out of the backlight 420 as right-circularly-polarized light 466R, and part is reflected as left-circularly-polarized light 468L. (In this example, the selection of polarizer 442 as right-circular transmitting and left-circular reflecting is wholly arbitrary and could be reversed.)

Reflected light 468L returns to specular partial reflector 450, where a portion of the light is transmitted as left-circularly-polarized light 470L, and a portion of the light is reflected as right-circularly-polarized light 472R. The specular reflection off of the specular partial reflector 450 transforms the polarization of the reflected light. This transformation puts light 472R in the proper state for transmission through the circular-mode reflective polarizer 442, resulting in transmitted light 474R. In this way, specular partial reflector 450 helps form a recycling cavity for the backlight 420.

Light 464 and 470L, propagating downward from the specular partial reflector 450, and light 476, propagating downward from light source 432, collectively represent light propagating toward the back reflector 434. This light reflects off back reflector 434 and is collectively represented by light 478, which propagates toward the specular partial reflector 450, where at least a portion of light 478 may be transmitted out of the backlight 420 as right-circularly-polarized light. In this way, back reflector 434 also helps form a recycling cavity for the backlight 420.

The polarization of the reflected light 478 will be affected by the properties of back reflector 434 and those of any other structures underlying specular partial reflector 450. In part, the polarization of light 478 may depend deterministically on the polarization states of light 464, 470L, and 476, and in part, it may be randomized, depending on factors such as the types of reflections undertaken and the birefringence of transparent materials traversed by the light. In comparison, right-circularly-polarized light 472R resulting from the partial reflection of left-circularly polarized light 468L off of specular partial reflector 450 can be highly deterministically polarized.

The performance of a backlight system having a circular-mode reflective polarizer and specular partial reflector will depend on a variety of factors, including the reflectivity of the specular partial reflector. Such reflectivity may be quantified by the orthogonal reflection fraction value as defined herein. As the orthogonal reflection fraction value is increased, a greater fraction of the light of the second polarization propagating from the circular-mode reflective polarizer to the specular partial reflector (e.g., 468L in FIG. 4) will be recycled back to the polarizer in the transmittable first polarization (e.g., 472R). At the same time, the increased reflectivity will attenuate the amount of light reaching the polarizer (e.g., 462) from the illumination device (e.g., 460, 478). The orthogonal reflection fraction value may be optimized with the goal of maximizing the brightness or other measurable parameter describing the light provided to the LC panel from the backlight. A study is described here to illustrate this aspect of the disclosure.

The performance of a backlight system employing a specular partial reflector was simulated using a model system. Various combinations of backlight components were placed on a top surface of an illumination device and the system performance was measured. The illumination device was a cube with sides approximately 13 cm long constructed of panels of diffuse white Teflon™ material. Light was introduced into the inside of the cube by a fiber optical bundle. Multiple reflections interior to the cube served to homogenize the light and resulted in highly uniform, homogenous output from the surfaces of the cube. First, a reference measurement was taken of the top face of the illumination device by itself. A Photo Research PR-650 spectroradiometer was used to take luminance measurements. After the reference measurement was taken, a reflective polarizer was placed on the illumination device, and the measurement was repeated. Next, a series of measurements were taken with an increasing number of glass reflector plates (microscope slides) serving as specular partial reflectors placed between the reflective polarizer and the illumination device. This protocol was performed both with a circular-mode reflective polarizer and a linear-mode reflective polarizer. Nipocs™, a cholesteric liquid crystal film available from Nitto Denko of Japan was used as a circular-mode reflective polarizer. DBEF-E and other similar DBEF variants, available from 3M Company, were used as linear reflective polarizers.

Figure 9:
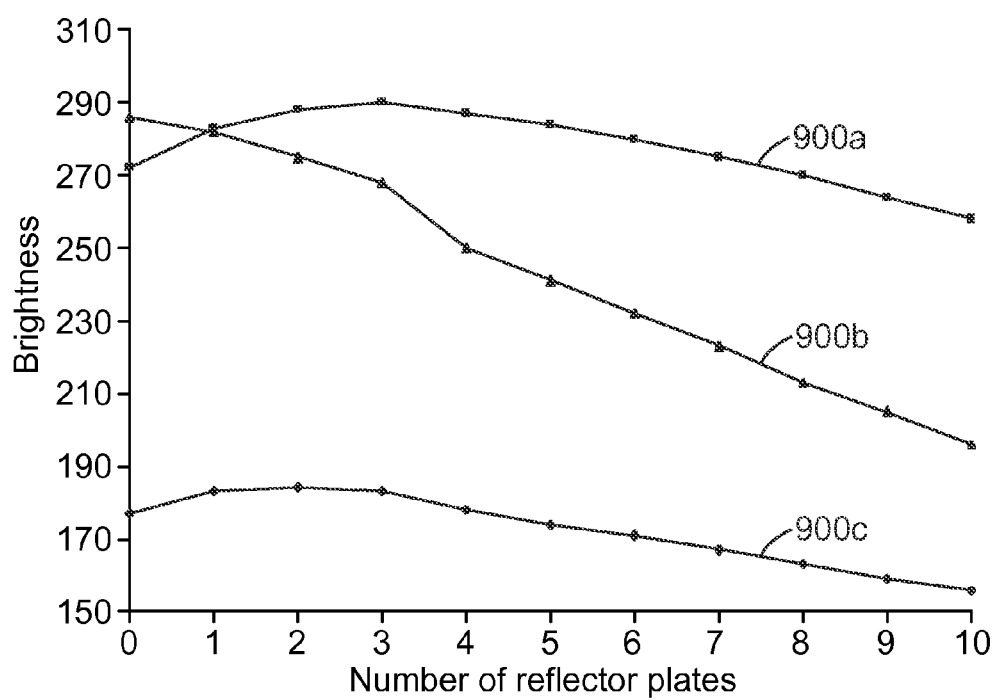
FIG. 9 is a chart showing the brightness performance of various embodiments of an illumination device and light management components versus the number of specular partial reflectors included.

FIG. 9 shows luminance, or brightness, (measured in cd/m², i.e., "nits") as a function of the number of glass reflector plates (with two reflective major surfaces per glass plate) for three backlight configurations: (a) with a circular-mode reflective polarizer, (b) with a linear-mode reflective polarizer, and (c) without a polarizer. Curve 900a shows an increase in brightness as glass plates are added to the system (and hence, the orthogonal reflection fraction increased) until brightness peaks with three plates, after which it declines with additional plates. The increase in brightness is attributed to improved recycling provided by the specular reflections from the glass plates. The decrease beyond three plates is presumed to be due to hindered transmission from the illumination device to the reflective polarizer through the increasingly reflective stack of plates. In contrast to the response of the system shown in curve 900a, the linear-mode reflective polarizer backlight's performance represented by curve 900b shows only a decrease in brightness as the specular partial reflector stack increases in reflectivity. This is expected; the specular reflections do not help recycling of linearly polarized light, as the reflections do not change the polarization state of the light. Curve 900c, which shows the brightness of the backlight with only the glass plates, shows an increase in brightness as the first plate is added. This is believed to be due to the glancing reflection of obliquely upwardly propagating rays of light off of the bottom of the glass plates. Some of this light that is reflected back toward the illumination device is recycled back up through the stack at an angle closer to normal, which the on-axis luminance measurement is sensitive to.

While the present disclosure discusses aspects of backlight operation and performance with regard to circularly-polarized light and circular-mode polarizers, those of skill in the art will recognize that pure polarization states of entirely circularly polarized light are generally to be considered a mathematical construct, and that in real systems, circularly polarized light will generally include a degree of ellipticity. Furthermore, benefits of backlights of the present disclosure may be realized in systems involving polarization states departing from purely circular, and hence such systems should generally be considered to be within the scope of this disclosure.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A backlight, comprising:
    an illumination device comprising at least one light source;
    a circular-mode reflective polarizer; and
    a specular partial reflector disposed between the illumination device and the circular-mode reflective polarizer, wherein the specular partial reflector has an orthogonal reflection fraction value of at least 2%;
    wherein the specular partial reflector is in substantially direct polarization communication with the circular-mode reflective polarizer.

2. The backlight of claim 1, wherein the illumination device further comprises a lightguide, wherein the at least one light source is optically coupled to an edge of the lightguide.

3. The backlight of claim 1, wherein the circular-mode reflective polarizer comprises a cholesteric liquid crystal layer.

4. The backlight of claim 1, wherein the circular-mode reflective polarizer comprises:
   a linear-mode reflective polarizer; and
   a quarter-wave retarder disposed between the linear-mode reflective polarizer and the specular partial reflector.

5. The backlight of claim 1, wherein the specular partial reflector comprises a layer disposed on a substrate, the substrate having an optical function different from that of the specular partial reflector.

6. The backlight of claim 1, wherein the specular partial reflector comprises a coating disposed on the circular-mode reflective polarizer.

7. The backlight of claim 1, wherein the specular partial reflector comprises a metalized partial reflector.

8. The backlight of claim 1, wherein the specular partial reflector comprises a plurality of substantially specularly-reflecting major surfaces.

9. The backlight of claim 8, wherein the specular partial reflector comprises a multilayer optical film.

10. The backlight of claim 9, wherein the multilayer optical film comprises one or more polymeric layers.

11. The backlight of claim 1, wherein the specular partial reflector has an orthogonal reflection fraction value of at least 4%.

12. The backlight of claim 1, wherein the specular partial reflector has an orthogonal reflection fraction value of at least 8%.

13. A display comprising a liquid crystal panel and a backlight that provides light to the liquid crystal panel, wherein the backlight comprises:
   an illumination device comprising at least one light source;
   a circular-mode reflective polarizer disposed between the liquid crystal panel and the illumination device; and
   a specular partial reflector disposed between the illumination device and the circular-mode reflective polarizer, wherein the specular partial reflector has an orthogonal reflection fraction value of at least 2%;
   wherein the specular partial reflector is in substantially direct polarization communication with the circular-mode reflective polarizer.

14. A backlight for providing polarized light, comprising:
   an illumination device comprising at least one light source;
   a circular-mode reflective polarizer configured to transmit a first portion of light having a first circular polarization and reflect a second portion of light having a second circular polarization orthogonal to the first circular polarization; and
   a specular partial reflector disposed between the illumination device and the circular-mode reflective polarizer, the specular partial reflector suitable for receiving the second portion of light from the circular-mode reflective polarizer and returning a third portion of light to the circular-mode reflective polarizer, the third portion of light being a fraction of the second portion of light and having the first circular polarization that is transmittable by the circular-mode reflective polarizer.

* * * * *